Patented Mar. 29, 1932

1,851,419

UNITED STATES PATENT OFFICE

HUGH MILLS BUNBURY AND WILLIAM JOHNSON SMITH NAUNTON, OF MANCHESTER, AND WILFRED ARCHIBALD SEXTON, OF HUDDERSFIELD, ENGLAND, ASSIGNORS TO IMPERIAL CHEMICAL INDUSTRIES LIMITED, A CORPORATION OF GREAT BRITAIN

VULCANIZATION OF RUBBER

No Drawing. Application filed May 1, 1931, Serial No. 534,442, and in Great Britain April 30, 1930.

It is well known that vulcanization accelerators are obtained by combining together amines and mercaptoarylenethiazoles, e. g. 2-mercapto-benzthiazole. Such accelerators, however, do not possess what is a desirable property, namely, that of delayed action. By this we mean that the accelerating function is only exerted above a certain temperature, so that there is no risk of premature vulcanization taking place, e. g. during milling operations.

It is the object of the present invention to provide vulcanization accelerators having this desirable property.

We have found, and our invention is based on the discovery, that vulcanization accelerators having this desirable property of delayed action are obtained by combining together a nitro derivative of an aromatic amine and a mercaptoarylene thiazole, e. g. 2-mercaptobenzthiazole, and commingling the product with a basic organic accelerator such as a diphenylguanidine.

We find that when the compounds of a nitro derivative of an aromatic amine and a mercaptoarylene thiazole are used alone they are but feeble accelerators, even at such temperatures as 140° C., whereas, while such mixtures as are made in accordance with our invention are devoid or almost devoid of accelerating properties at low temperatures, even at, e. g. 110° C., they are rapid accelerators at higher temperatures, e. g. 140° C.

Our invention is illustrated, but not limited by the following example, in which the parts are by weight.

Example 167 parts of mercaptobenzthiazole are used with 138 parts (i. e. an equimolecular proportion) of p-nitro-aniline, and the resulting resinous product is pulverized. Alternatively the product may be obtained by heating the substances together in alcoholic solution. It is believed to be a salt-like compound represented by the formula:—

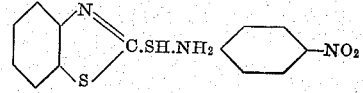

0.25 parts of the product so obtained are incorporated together with 0.25 parts of diphenylguanidine into a rubber mix composed of pale crepe rubber 100 parts, zinc oxide 10 parts, barytes 75 parts and sulphur 2.5 parts. Vulcanization is carried out at a temperature of 141° C. for a period of 20 minutes. The rubber then has a tensile strength at break of 143 kilog. per sq. cm. When the vulcanization is effected at 110° C. for 50 minutes, the cure is incomplete.

The comparative ineffectiveness of the product when used alone is illustrated by the following. 0.5 parts of the product were incorporated into a similar rubber mix. Vulcanization was carried out at 141° C. for 20 minutes. The product had a tensile strength at break of only 26 kilog. per sq. cm.

As many apparently widely different embodiments of this invention may be made without departing from the spirit and scope thereof, it is to be understood that we do not limit ourselves to the specific embodiments thereof except as defined in the appended claims.

We claim:

1. A process for the manufacture of vulcanized rubber which comprises heating a rubber mix containing as vulcanization accelerator a mixture of a basic organic accelerator and a compound obtainable by fusing together equimolecular proportions of a mono-nitro-aniline and 2-mercaptobenzthiazole.

2. A process for the manufacture of vulcanized rubber which comprises heating a rubber mix containing as vulcanization accelerator a mixture of a basic organic accelerator and a compound obtainable by fusing together equimolecular proportions of p-nitroaniline and 2-mercaptobenzthiazole.

3. A vulcanization accelerator which comprises a basic organic accelerator and a compound obtainable by fusing together a mono-nitroaniline and 2-mercaptobenzthiazole.

4. A vulcanization accelerator which comprises a basic organic accelerator and a compound having the formula:

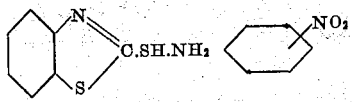

In testimony whereof we affix our signatures.

HUGH MILLS BUNBURY.
WILLIAM JOHNSON SMITH NAUNTON.
WILFRED ARCHIBALD SEXTON.